United States Patent
Andoralov et al.

(10) Patent No.: US 11,600,450 B2
(45) Date of Patent: Mar. 7, 2023

(54) HYBRID CAPACITOR WITH IMPROVED ESR STABILIZATION

(71) Applicant: KEMET Electronics Corporation, Fort Lauderdale, FL (US)

(72) Inventors: Victor Andoralov, Évora (PT); Vania Pais, Évora (PT); Débora Sá, Évora (PT); Miguel Evaristo, Évora (PT); Rui A. Monteiro, Évora (PT)

(73) Assignee: KEMET Electronics Corporation, Fort Lauderdale, FL (US)

( * ) Notice: Subject to any disclaimer, the term of this patent is extended or adjusted under 35 U.S.C. 154(b) by 0 days.

(21) Appl. No.: 17/405,645

(22) Filed: Aug. 18, 2021

(65) Prior Publication Data
US 2022/0059296 A1   Feb. 24, 2022

Related U.S. Application Data

(60) Provisional application No. 63/067,946, filed on Aug. 20, 2020.

(51) Int. Cl.
| | | |
|---|---|---|
| *H01G 9/052* | (2006.01) | |
| *H01G 9/15* | (2006.01) | |
| *H01G 9/00* | (2006.01) | |
| *H01G 9/07* | (2006.01) | |
| *H01G 9/042* | (2006.01) | |

(52) U.S. Cl.
CPC ........... *H01G 9/052* (2013.01); *H01G 9/0036* (2013.01); *H01G 9/0425* (2013.01); *H01G 9/07* (2013.01); *H01G 9/15* (2013.01)

(58) Field of Classification Search
CPC .................................................. H01G 9/0425
See application file for complete search history.

(56) References Cited

U.S. PATENT DOCUMENTS

| | | | |
|---|---|---|---|
| 7,875,087 B2 | 1/2011 | Norton et al. | |
| 10,074,490 B2 | 9/2018 | Chacko et al. | |
| 10,734,163 B2 | 8/2020 | Aoyama et al. | |
| 2004/0240149 A1* | 12/2004 | Lessner | H01G 9/042 361/503 |
| 2017/0294273 A1* | 10/2017 | Andoralov | H01G 9/151 |
| 2018/0323015 A1* | 11/2018 | Andoralov | H01G 11/26 |
| 2018/0374649 A1 | 12/2018 | Ishikawa et al. | |
| 2019/0172652 A1 | 6/2019 | Biler et al. | |
| 2020/0105479 A1 | 4/2020 | Matsushita et al. | |

OTHER PUBLICATIONS

ISA/US; ISR and Written Opinion prepared for PCT/US2021/046505; dated Nov. 9, 2021.

* cited by examiner

*Primary Examiner* — Eric W Thomas
(74) *Attorney, Agent, or Firm* — Joseph T. Guy; Patent Filing Specialist Inc.

(57) ABSTRACT

Provided is a capacitor, and more preferably a hybrid capacitor, and a method of making the capacitor. The capacitor comprises an anode, with a dielectric on the anode, and a cathode with a barrier layer on the cathode. A separator, conductive polymer, liquid electrolyte and stabilizer are between the anode and cathode.

63 Claims, 9 Drawing Sheets

HYBRID CAPACITOR WITH IMPROVED ESR STABILIZATION

CROSS-REFERENCE TO RELATED APPLICATIONS

This application claims priority to U.S. Provisional Application No. 63/067,946 filed Aug. 20, 2020, which is incorporated herein by reference.

FIELD OF THE INVENTION

The present invention is related to a hybrid capacitor with improved equivalent series resistance (ESR) stability at higher temperature and voltage. More specifically, the present invention is related to an improved hybrid capacitor comprising a barrier layer on the cathode and a stabilizer to inhibit decay of the conductive polymer.

BACKGROUND

Hybrid aluminium capacitors are a complex system comprising an anode covered with a dielectric, a cathode and a separator between the dielectric and cathode. A conducting polymer between the dielectric and cathode assures electrical connection between the anode and the cathode through the dielectric to create a capacitive couple. An electrolyte fills the available volume in the separator/polymer structure to facilitate self-healing if there are defects in the dielectric.

There are three main interfaces in a hybrid capacitor of importance herein. The interfaces are the interface between the dielectric and polymer, the interface between the cathode and polymer and the interface between the electrolyte and polymer. The interface between the dielectric and polymer has little impact on the conductivity of the polymer. Direct contact between the polymer and metal of the cathode surface, in combination with the interface of the electrolyte and polymer, allows electrochemical reactions which can transform the polymer to a non-conducting state. Practically, one can observe the conducting polymer reduction when a high leakage current is applied, or a high cathode polarization happens, during surge voltage overloading. A high cathode polarization is a significant negative potential which results in enough DC current to electrochemically reduce a significant portion of the polymer.

The most common conducting polymers are conjugated polymers such as polyaniline (PANI), polyacetylene (PA), polypyrole (PPy), polythiophene (PT), polyparaphenylene (PPP) and polyparaphenylene vinylene (PPV). Conjugated polymers demonstrate higher conductivity in the positive bipolaron state wherein the polymer is oxidized from the neutral state to the bipolar state as illustrated in FIG. 1A for 3,4-polyethylene dioxythiophene (PEDOT), FIG. 1B for PPy and FIG. 1C for PANI. The polaron state is formed by chemical or electrochemical oxidation of the neutral polymer chain with further oxidation leading to the bipolaron state.

The bipolaron state corresponds to a high degree of p-doping since the Fermi energy level is closer to the Highest Occupied Molecular Orbital (HOMO) energy level. For some conducting polymers a neutral chain can turn to a polaron or bipolaron through protonation, such as by treatment with low pH solutions, however this must be considered as an intramolecular oxidation by protons. With PAN and PPY polymers electrons have to be accepted from low energy electron levels for a proton to be involved in the reaction and therefore the concentration should thermodynamically allow the process of "hole" generation from the accepted proton. If a proton is not involved, as in PEDOT, the polymer doping can be conducted only through intermolecular oxidation.

The oxidation is a reversable process. Therefore, to reduce a bipolaron back to a lower conductivity polaron state, and almost non-conducting neutral state, the Fermi level should be increased, or electrochemical potential decreased, for the polymer. Furthermore, for reduction a source of electrons should exist and ionic exchange must be allowed to maintain the overall electroneutrality. The reduction process can occur through chemical or electrochemical mechanisms.

In the absence of electrolyte the reduction process is significantly suppressed since the activation barriers are high and a strong reducing agent is required. However, in a hybrid capacitor comprising electrolyte the activation barriers are reduced due to solvation of the reagents, adsorption and ionic mass transfer.

Electrochemical reduction may also take place when the polymer is in a direct electronic contact with a metal electrode and the Fermi level in the electrode is high enough to assure electron tunnelling to the bipolaron or polaron bands. When the bipolaron band is filled out with electrons the gap between the Fermi level and highest unoccupied molecular orbit (HUMO), or the valence band, gets larger resulting in overall polymer conductivity decrease.

The present invention provides structural components capable of mitigating reduction of the conductive polymer thereby providing improved performance, particularly, with regards to ESR at high temperatures and voltages.

SUMMARY OF THE INVENTION

It is an object of the invention to provide an improved hybrid capacitor which is stable at high temperatures and high voltage.

A particular feature of the invention is the presence of a barrier layer on the cathode which inhibits electrochemical reduction of the conductive polymer and a stabilizer which competes with the conductive polymer for electrons thereby also providing protection against electrochemical reduction of the conductive polymer.

A particular advantage of the invention is the ability to utilize hybrid capacitors in high temperature and high voltage applications.

These and other advantages, as will be realized, are provided in a capacitor, and more preferably a hybrid capacitor. The capacitor comprises an anode, with a dielectric on the anode, and a cathode with a barrier layer on the cathode. A separator, conductive polymer, liquid electrolyte and stabilizer are between the anode and cathode.

Yet another embodiment is provided in a method for forming a hybrid capacitor. The method comprises:
forming an anode with a dielectric on the anode;
forming a cathode with a barrier layer on the cathode;
forming a separator;
forming a working element comprising a layered structure with a conductive polymer, a liquid electrolyte, a stabilizer and separator between the anode and cathode.

DESCRIPTION

The present invention is related to an improved hybrid capacitor which mitigates electrochemical reduction of conducting polymer. More specifically, the present invention is related to an improved hybrid capacitor wherein stabilization of the conducting polymer is provided by the combination of a barrier layer on the cathode and a stabilizer in the electrolyte or on the conductive polymer. The barrier layer minimizes the probability of direct electronic contact between the metal of the cathode and the conductive polymer thereby mitigating the transfer of electrons to the conductive polymer. The stabilizer functions as an electron acceptor thereby mitigating the transfer of electrons in solution, or on the metal, from reducing the conductive polymer.

The barrier layer is preferably formed on the cathode surface prior to the capacitor working element being assembled. The barrier layer mitigate the defects in the oxide coating of the cathode. The stabilizer is added to the electrolyte and/or the polymer surface in the polymer/electrolyte interface.

Figure 1A:
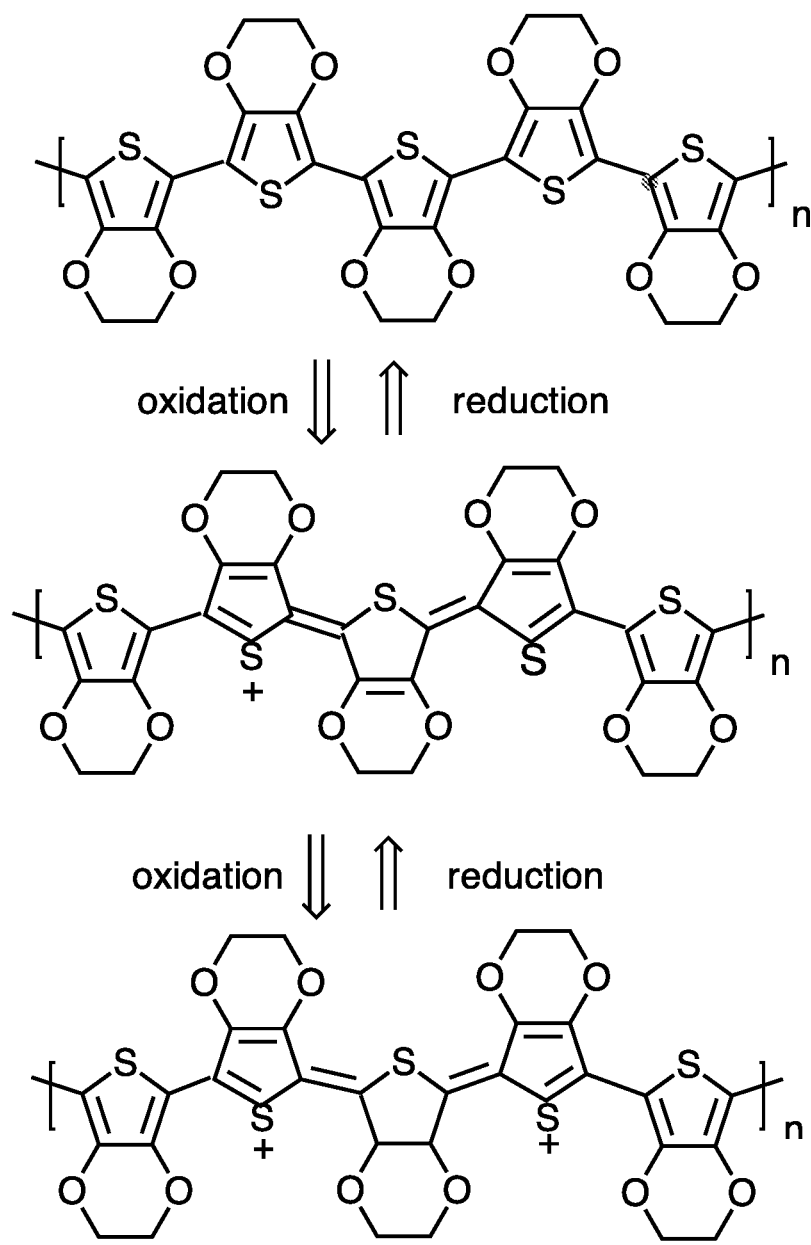
FIGS. 1A-1C schematically illustrate the transitions from neutral, to polaron and bipolar for various conductive polymers
Figure 1B:
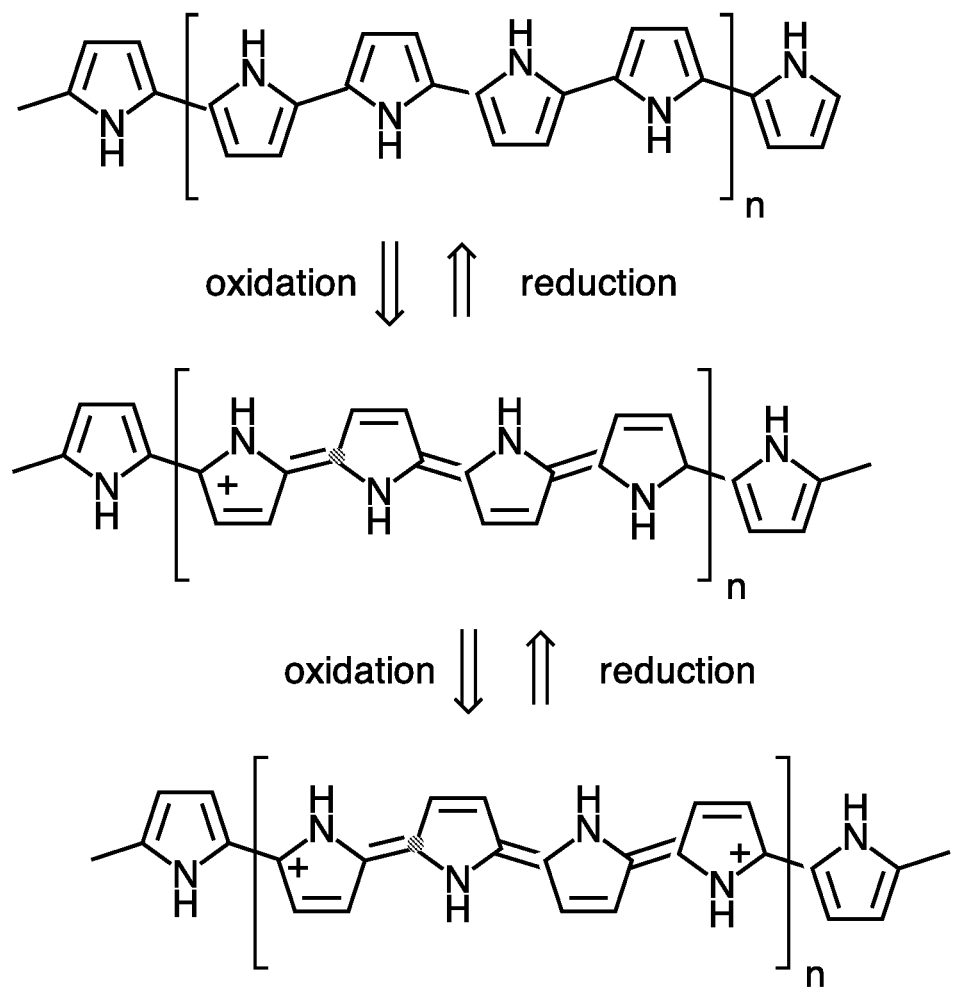
Figure 1C:
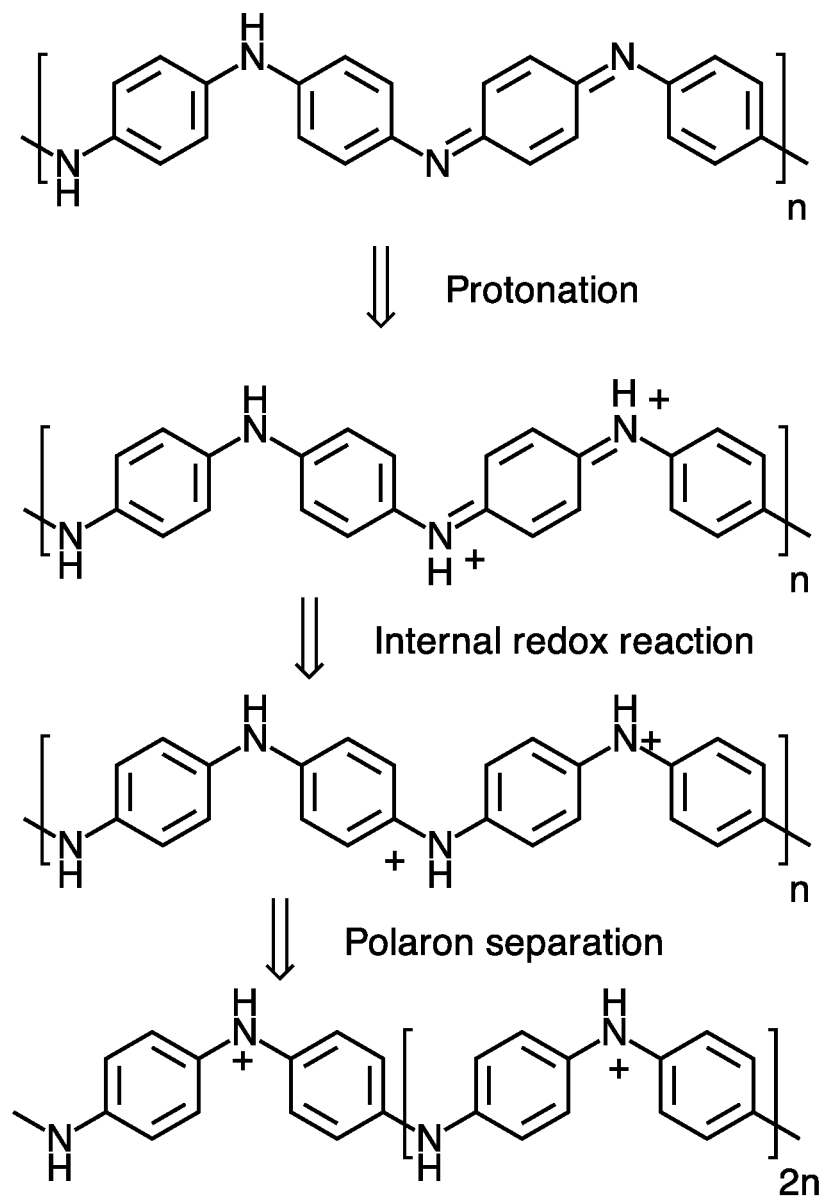

To elucidate the mechanism of degradation, the degradation mode was modelled experimentally based on the chemical equilibrium of PEDOT between a neutral state and bipolaron state which is illustrated schematically in FIG. 1A. A significant ESR increase was observed when a hybrid aluminium capacitor was overstressed by conducting high leakage current during a long period of time. The high leakage current caused the conductive polymer to be electrochemically reduced. During the test ESR, increased from a pre-test resistance of 14 mOhm up to a range of 130 mOhm-160 mOhm measured after testing. The capacitor was opened allowing oxidation of the polymer by oxygen from the air to return the conductive polymer to the bipolaron state. After 12 h storage in air atmosphere the ESR returned to an almost initial level of 16 mOhm.

Based on the efforts to elucidate the mechanism of degradation, it has been realized that both electrochemical reduction and oxidation mechanisms require an ionic pool which can compensate the charge change happening due to electron transfer from the cathode. An electrolyte of the hybrid capacitor provides an ionic pool. Thus, the polymer degradation through electrochemical reduction is one potential source of capacitor degradation, and specifically ESR instability at high leakage current or significant surge voltage.

While not limited to theory, it is hypothesized that liquid stabilizers suppress reduction of bipolarons to polarons and neutral states by preferentially accepting the high energy electrons from the cathode thereby essentially draining the electrons down in energy through a chain of intermediates to a final product. The final product is characterized with a low reduction-oxidation related Fermi Level or a high electrochemical potential of oxidation. In this case the polymer can assure conductivity between the electrode and the final electron acceptor, which is the stabilizer, without significant changes of energy band structure of the polymer. The stabilizer functions as an electron acceptor and is reduced instead of the polymer. Due to the irreversible process, or a chain of reversable processes, the final product does not affect the state of the polymer.

Figure 2:
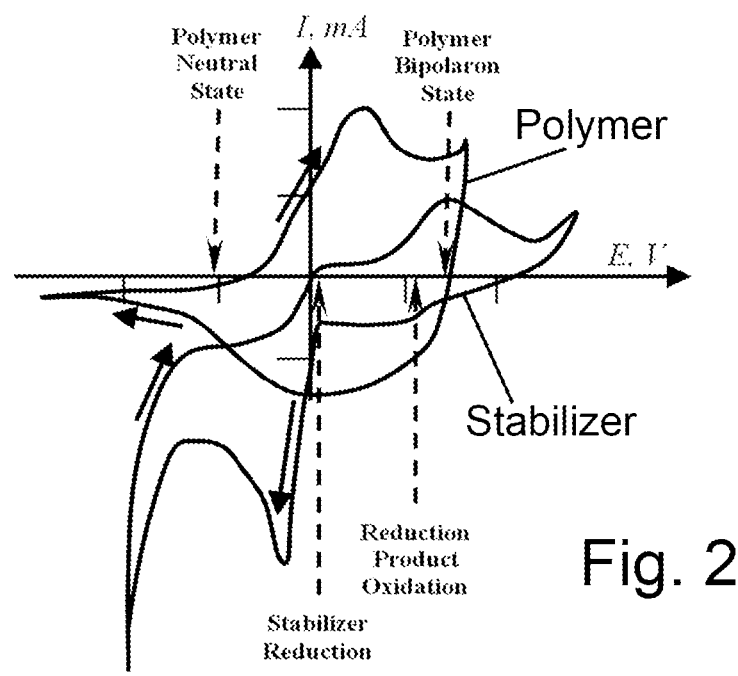
FIG. 2 is a graphical representation of cyclic voltammograms for conducting polymer film and soluble stabilizer.

The stabilizers have a first electrochemical reduction potential which is higher than a second electrochemical reduction potential of the polymer under the same conditions. However, the potential of electrochemical oxidation of the product is near the potential corresponding to HOMO or highest occupied bipolaron band as illustrated in FIG. 2 wherein a graphical representation of cyclic voltammograms for conducting polymer film and soluble stabilizer is provided. The electrochemical reduction potentials of the stabilizer and oxidation of the product are indicated vs. the highest potentials of neutral state and bipolaron. In this case, the final product cannot reduce the polymer from the bipolaron state. Also, the final product can over-oxidize the polymer since this would require getting electrons from the valence band which can lead to the polymer structure/composition change affecting band diagram.

The invention will be described with reference to the figures which are integral, but non-limiting, part of the specification provided for clarity of the invention. Throughout the various figures similar elements will be numbered according.

Figure 3:
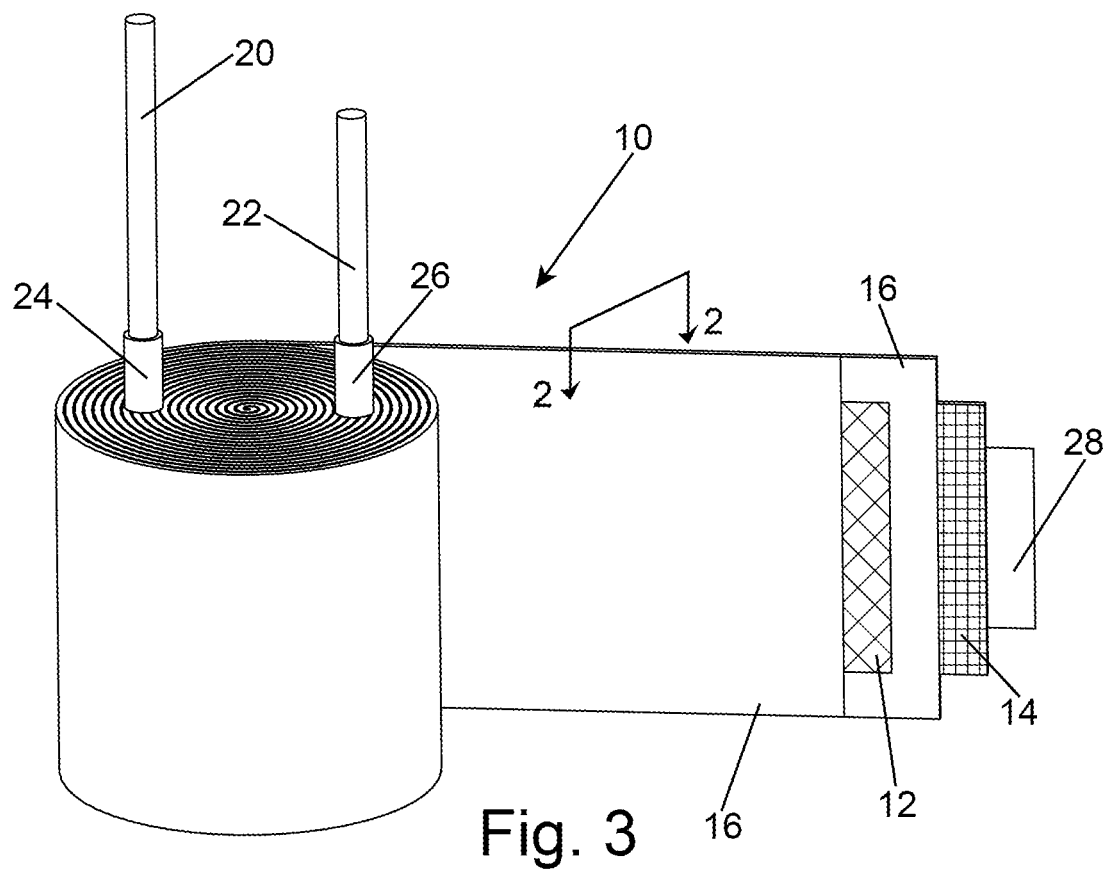
FIG. 3 is a schematic representation of an embodiment of the invention.

An embodiment of the invention will be described with reference to FIG. 3 wherein a working element is shown in schematic partially unwound view prior to insertion into a container and optionally, but preferably, impregnation with liquid electrolyte. In FIG. 3, the working element, generally represented at 10, comprises an anode, 12, and cathode, 14, with a separator, 16, which may be a conductive separator, there between. A conductive separator has a conductive polymer either coated on the separator or the separator is impregnated, and preferably saturated, with conductive polymer. An anode lead, 20, and cathode lead, 22, extend from the wound capacitor and ultimately form the electrical connectivity to a circuit. It would be understood from the description that the anode lead is in electrical contact with the anode and the cathode lead is in electrical contact with the cathode and electrically isolated from the anode or anode lead. Tabs, 24 and 26, are commonly employed to electrically connect the anode lead to the anode and the cathode lead to the cathode as known in the art. A closure, 28, such as an adhesive tape inhibits the working element from unwinding during handling and assembly after which the closure has little duty even though it is part of the finished capacitor.

Figure 4:
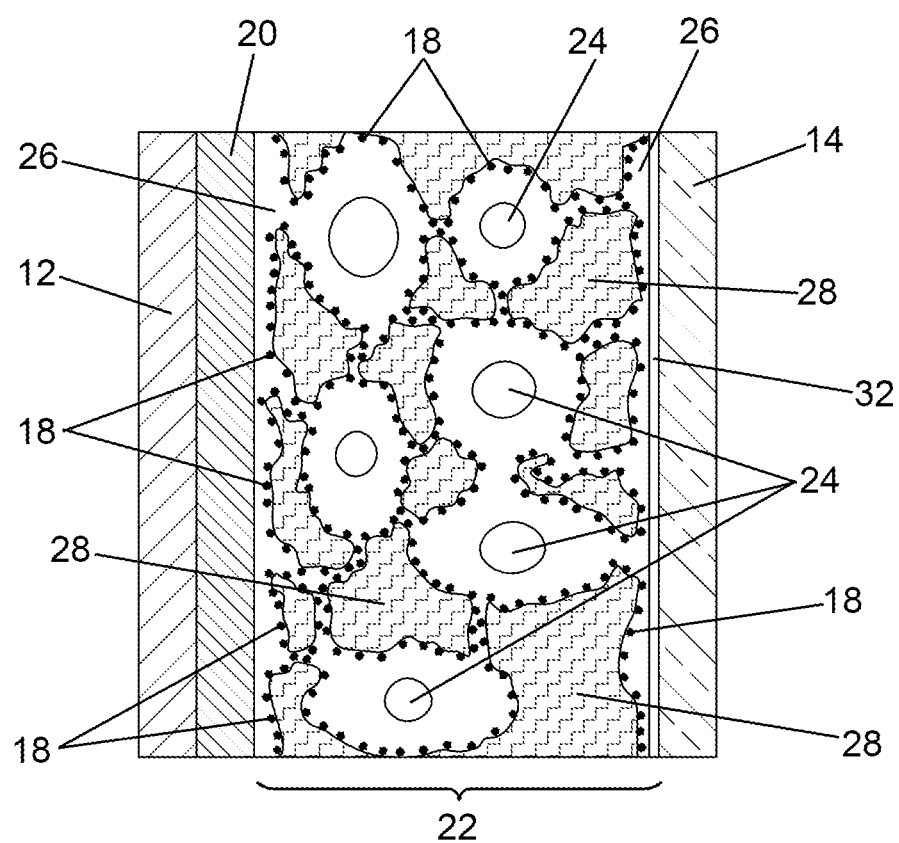
FIG. 4 is a schematic representation of an embodiment of the invention.

An embodiment of the invention will be described with reference to FIG. 4 wherein a portion of a wound capacitor is illustrated in cross-sectional schematic view. In FIG. 4, the anode, 12, and cathode, 14, have a dielectric, 20, and separator layer, 22, there between which forms a capacitive couple. Only one capacitive couple is illustrated herein with the understanding that the wound capacitor would have interleaved and repeating combinations of anode/dielectric/separator layer/dielectric. The separator layer comprises a separator which in one embodiment comprises interwoven fibers, 24. A conductive polymer, 26, which may be formed prior to winding or may be introduced after winding, forms an electrically conductive path from the dielectric to the cathode. Stabilizer, 18, is a solid on the surface of the conductive polymer. An optional, but preferred, liquid electrolyte, 28, at least partially, and preferably completely, fills all interstitial areas of the separator. A barrier layer, 32, is on and preferably covers the cathode.

Figure 5:
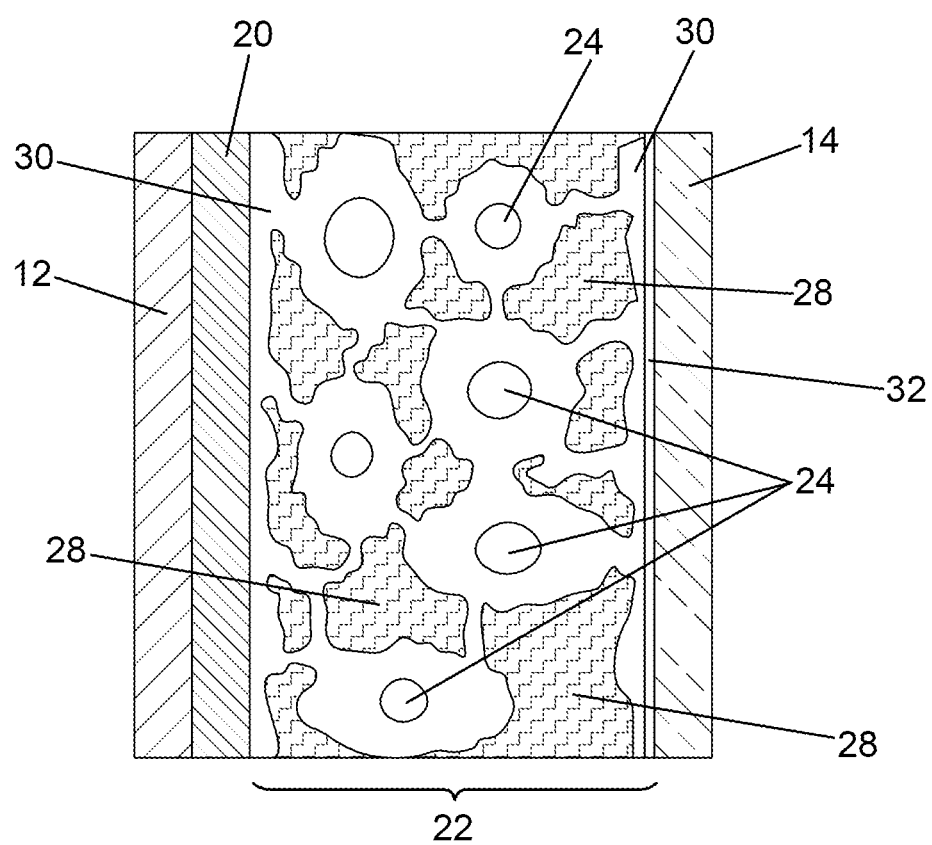
FIG. 5 is a schematic representation of an embodiment of the invention.

An embodiment of the invention will be described with reference to FIG. 5 wherein a portion of a wound capacitor is illustrated in cross-sectional schematic view. In FIG. 5, the anode, 12, and cathode, 14, have a dielectric, 20, and separator layer, 22, conductive polymer, 30, and barrier layer, 32, are as discussed relative to FIG. 4. The liquid electrolyte is a stabilized liquid electrolyte, 28 comprising liquid stabilizer which is dissolved in the liquid electrolyte.

The barrier layer thickness is preferably in the range of at least 1 nm up to no more than 500 nm. The main function of the barrier layer is to insulate the electrode from the polymer while assuring the required level of capacitance and efficient contact between the polymer layer, barrier layer and metal for AC conductivity. The barrier layer may be porous.

The material for the barrier layer can be selected from dielectric or insulators which are suitable for the application. Some metals suitable for use in a capacitor, such as aluminium, are oxidized in the air atmosphere producing a thin oxide layer, referred to in the art as native oxide, of about 1-2 nm. The thickness of native oxide is not sufficient to suppress direct electron transfer between the electrode metal and the conductive polymer. Therefore, when an oxide is used as a barrier layer the thickness is preferably at least 3.0 nm up to no more than 250 nm with at least 40% of the surface area of the cathode covered by oxide. More preferably at least 50% of the surface is covered by oxide, more preferably at least 90% and most preferably 100%. The dielectric constant of the barrier layer is preferably at least 2.0, more preferably at least 5.0 and most preferably at least 9.0 with barrier layers having even higher dielectrics preferred.

Particularly preferred barrier layer materials include chemically or electrochemically formed alumina ($Al_2O_3$); silica ($SiO_2$); silicates; siloxanes such as $H(OSiH_2)_nOH$ and $(OSiH_2)_n$ wherein n is 1 to 5000; aluminium silicates $[(Al_2O_3)_a(SiO_2)_b(H_2O)_c]$; phosphates, particularly aluminium phosphate ($AlPO_4$); organic insulating polymers such as polyalkenes and particularly (PP, PE); polyacrylates; polysaccharides, particularly cellulose, chitosan or starch and ceramics such as $\{(Ba_{1-x}Ca_x)O\}_m\{(Ti_{1-y}Zr_y)O_2\}_{1-m}$, $BaTiO_3$, $Ba(Zr_xTi_{1-x})O_3$ or $Ba(Hf_xTi_{1-x})O_3$ wherein x is 0-1 and m=0-1. The barrier layer may be amorphous or crystalline.

The main function of the stabilizer is to drain electrons from conducting polymer to prevent band energy level changes in the polymer. Stabilizers are either solid stabilizers or liquid stabilizers. Particularly preferred solid stabilizers are selected from insoluble organic peroxides and chelate complexes of transition metals on a polymeric backbone. Soluble stabilizers include soluble peroxides, organic nitro compounds and gas stabilizers.

Soluble organic peroxides are preferably peroxides comprising alkyl groups having 1-20 carbons or aromatic groups. The alkyl groups can be straight or branched. The organic peroxide can be in solution or cross-linked to or incorporated into insoluble plasticiser or gel matrix or insoluble organic peroxides are desired. Exemplary organic peroxides are selected from the group consisting of:

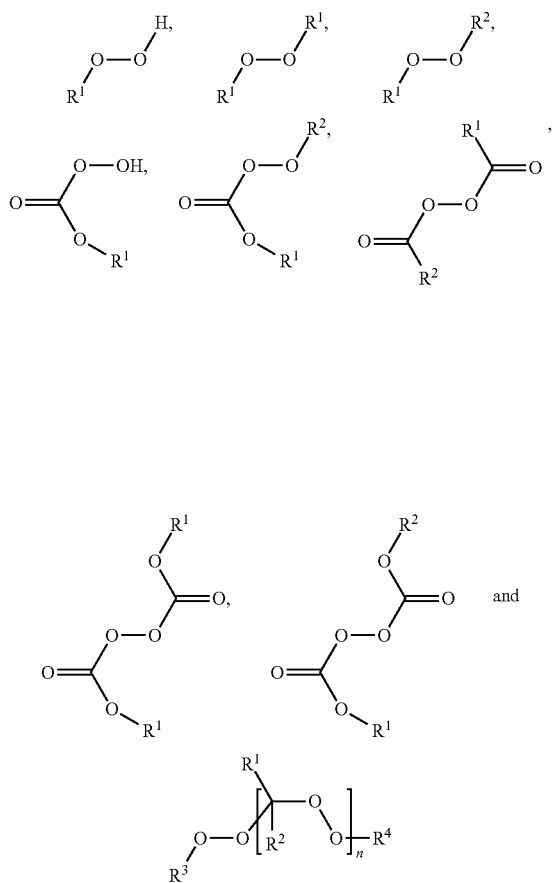

wherein each $R^1$, each $R^2$, $R^3$ and $R^4$ is independently an alkyl group having 1-20 carbons or an aryl group and n is 1 to 20.

Chelate complexes of transition metals on a polymeric backbone comprise a metal cation, a number of blocks and ligands adjusted to achieve a reduction/oxidation potential which is higher than the potential of the polymer as discussed above. Particularly preferred chelate complexes are the group consisting of:

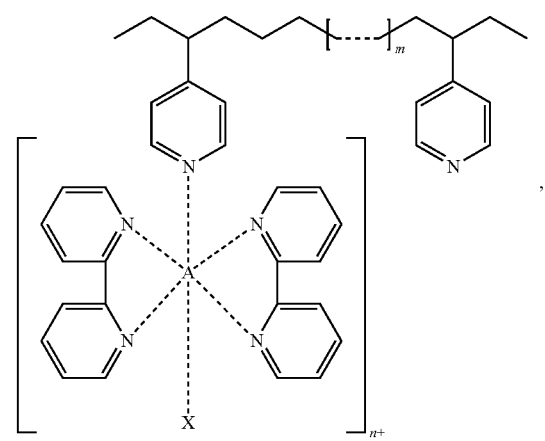

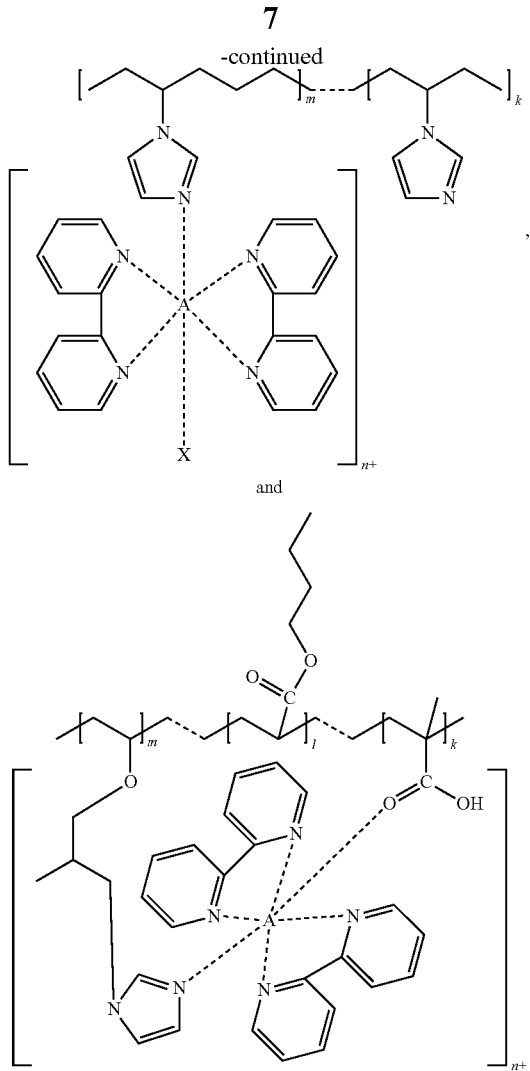

wherein:
A is selected from the group consisting of Fe, Co, Os and Ru;
X is a monomolecular ligand preferably selected from the group consisting of heptafluorobutyrate, 4-nitrobenzoate, triflate, chloride, bromide, iodide, phosphate, phthalate, tosylate, hexafluorophosphate, tetrafluoroborate and perchlorate;
n is 1 or 2;
m is 1 to 100;
k is 1 to 100; and
l is 1 to 100.

Organic nitro compounds have a formula $R^5$-$R^6$—$NO_2$, wherein:
$R^5$ is selected from alkyl of up to 20 carbons, alcohol, carboxyl and hydroxyl group;
$R^6$ is an aromatic $C_6$ ring or a substituted aromatic $C_6$ ring with preferred substitutions including alkyl of up to 20 carbons or hydroxyl groups with a preference for substitution in the 2 or 3 position on the aromatic $C_6$ ring, aromatic $C_{6+4}$ naphthalene and most preferably $R^6$ is selected from the group consisting of (o,m,p)-nitro anisole, (o,m,p)-nitrobenzyl alcohol, (o,m,p)-nitrobenzoic acid, 4-nitrosalicylic acid and 4-nitro-1-naphthoic acid.

A particularly preferred gas stabilizer is oxygen in a concentration range of 1 ppm to 1000 ppm of total gas volume in the capacitor.

The form of the hybrid capacitor is not particularly limited herein. The invention can be demonstrated with any shape or form factor including conventional designs such as V-chip, Axial, SI, ST, Flat Pack and others as known in the art.

The method of formation of a hybrid capacitor is not altered herein with the exception of the additional formation of a barrier layer on the cathode and addition of a stabilizer. A hybrid capacitor can be manufacture by applying different methods of anode surface treatment, cathode barrier layer forming and separator treatment/modification/manufacturing.

The anode, cathode and separator are typically independently prepared prior to assembly of the capacitor including dielectric formation on the anode and the formation of a barrier layer on the cathode. It is preferable to form the conductive polymer layers on the anode and cathode by applying either precursors, such as monomer and oxidizer, to form the conductive polymer in-situ, or by applying a polymer dispersion with or without the selected additives. Polymer formation in hybrid capacitors is well known to those of skill in the art and includes either formation of the conductive polymer on the anode and cathode prior to forming the layered structure or after the rolled layers are in the container.

The separator can be modified by applying conductive polymer formed from monomer in-situ or by application of a preformed polymer dispersion, as known in the art, with or without selected additives.

The electrolyte is typically provided with selected additives or without. The anode and cathode, with the separator there between, is wound to form the working element. After winding the working element can be treated including the formation of the dielectric or the cathode barrier layer, post polymerizations in the working element through in-situ process or polymer dispersion application, drying and washing if required. The working element is impregnated with electrolyte typically after placing the working element in the housing or container which is also referred to in the art as a can. The housing is sealed, preferably hermetically sealed, preferably under controlled conditions where gas atmosphere contains at least 50 ppm of oxygen. It is preferable that the gas phase is at no more than 20 volume % and more preferably not more than 10 volume % of the can. The capacitor is typically aged after assembly tested at rated temperature and voltage prior to packaging.

The cathode foil, separators and anode foil are typically provided as a wide roll and slit to size. The anode foil is preferably etched and a dielectric is formed thereon. The dielectric may be formed prior to slitting in which case a subsequent step is desirable to form dielectric on the slit edge. The separator may be treated with a coupling agent, to improve adhesion between the surface and conductive polymer layer, or to impart other specific surface behaviors. The conductive separator may be washed and dried before or after conductive polymer layer formation or impregnation and the conductive polymer layer formation or impregnation step may be repeated several times if required. Electrical leads, or tabs, are typically electrically connected to the anode and cathode, preferably prior to cutting to length and the leads may be treated with masking material to protect them from farther modification and to keep them ready for welding to capacitor terminals.

The conductive polymer is applied to the separator by any suitable method including immersion, coating or spraying. In immersion the separator is pulled through a series of baths or vessels with sequential application of monomer and oxidizer in either order. Immersion is preferred for the separator. Coating and spraying may be done with any printing technique including screen printing or spraying of a monomer or oxidizer either sequentially, in any order, or simultaneously onto the surface of the separator. It is preferable that the conductive polymer coating be applied to the separator at an amount of at least 0.1 mg/cm$^2$. Below about 0.1 mg/cm$^2$ the coating weight is insufficient for adequate conduction and incomplete coating may result. It is preferable that the conductive polymer coating be applied in an amount sufficient to achieve a coating weight of no more than about 10 mg/cm$^2$. Above about 10 mg/cm$^2$ the added coating thickness does not appreciably increase the conductivity.

Multi-tab or multi-leads minimize the foil resistance effect and are preferred. With a single lead the current must flow from the furthest extent of the foil to the tab and lead which is detrimental to ESR. It is preferable to utilize multiple anode leads and multiple cathode leads thereby decreasing the conductive path length.

The anode is a conductive metal preferably in the form of a foil. The conductive metal is preferably a valve metal or a conductive oxide of the valve metal. Particularly preferred anodes comprise a valve metal such as tantalum, aluminum, niobium, titanium, zirconium, hafnium, alloys of these elements, or a conductive oxide thereof such as NbO. Aluminum is a particularly preferred anode material.

An oxide film is formed on the anode as the dielectric. The dielectric may be formed using any suitable electrolyte solution, referred to as a forming electrolyte, such as a phosphoric acid or a phosphate-containing solution, boric acid, borate containing solution or ammonium adipate. A formation voltage of from about 9 V to about 450 V is commonly applied. The formation voltage typically ranges from 1.5 to 3.5 times the rated voltage of the capacitor.

The conductive polymer application process is generally selected from in-situ polymer formation and application of a preformed polymer from a slurry such as by a coating process. For the in-situ process impregnating solutions are applied to the surface wherein the impregnating solutions preferably contain monomer, oxidizing agent, dopant and other adjuvants as known to those of skill in the art. The selection of a suitable solvent for the solution is well within the level of skill in the art. Examples of suitable solvents include ketones and alcohols such as acetone, pyridine, tetrahydrofuran, methanol, ethanol, 2-propanol, and 1-butanol. The monomer concentration may be from about 1.5 wt. % to about 20 wt. %, more preferably from about 5 wt. % to about 15 wt. % for demonstration of the invention. Suitable monomers for preparing conductive polymers include but are not limited to aniline, pyrrole, thiophene, and derivatives thereof. A preferred monomer is 3,4-ethylenedioxythiophene. The oxidizing agent concentration may be from about 6 wt. % to about 45 wt. % and more preferably from about 16 wt. % to about 42 wt. % for demonstration of the invention. Oxidizing agents for preparing conductive polymers include Fe(III) salts of organic and inorganic acids, alkali metal persulfates, ammonium persulfate, and others. A preferred oxidant for demonstration of the invention is Fe(III) tosylate. The dopant concentration may be from about 5 wt. % to about 30 wt. % and more preferably from about 12 wt. % to about 25 wt. %. Any suitable dopant may be used, such as polystyrene sulfonate, dodecyl benzenesulfonate, p-tosylate, or chloride. The preferred dopant is p-tosylate. The substrates are cured at a temperature of from 65° C. to about 160° C. and more preferably from about 80° C. to about 120° C. thereby allowing the monomer to polymerize. After curing, the polymer layer is preferably washed in deionized water or another solvent.

Application of a preformed polymer from a slurry after winding is a preferred method for introducing the conductive polymer into the winding. The polymer can be prepared as a slurry or obtained commercially as a slurry, without particular limit to the technique, preferably followed by drying. A slurry of polymerized 3,4-ethylenedioxythiophene doped with polystyrene sulfonate or another suitable dopant, with a particle size of no more than 200 nm, preferably at least 1 nm to no more than 200 nm, more preferably at least 20 nm to no more than 200 nm, in a solvent is exemplary for demonstration of the invention. A particularly preferred slurry has an indistinguishable particle size by scatter techniques and is referred to as a soluble conductive polymer The liquid electrolyte is a solvent preferably with a supporting salt therein. Any conventional solvent can be used with exemplary solvents including γ-butyrolactone, sulfolane, ethylene carbonate, propylene carbonate, dimethyl carbonate, ethyl methyl carbonate, acetonitrile, propionitrile, dimethyl formamide, diethyl formamide, water, silicone oil, polyethylene glycol and mixtures thereof. Though not required a supporting salt is preferred. Exemplary supporting salts include inorganic acid ammonium salts, inorganic acid amine salts, inorganic acid alkyl substituted amide salts, organic ammonium salts, organic acid amide salts, organic acid alkyl substituted amide salts and derivatives thereof. Any gas absorbents or cathode electrochemical depolarizers can be used. Exemplary supported additives include nitro derivatives of organic alcohols, acids, esters, aromatic derivatives such as o-, m-, p-nitroanisole, o-,m-,p-nitrobenzoic acid, o-,m-,p-nitrobenzene alcohol. A particularly preferred hybrid capacitor comprises up to 50 wt % liquid electrolyte.

The separator is not particularly limited herein and any commercially available separator can be used to demonstrate the invention with the proviso that it is a material used for the conductive separator can either be coated with, or impregnated with, a conductive polymer. Alternatively, or in addition to the conductive polymer, the separator may itself be a conductive material. Exemplary separators for the conductive separator function as a skeleton layer for the conductive polymer. The separator can be fabricated in the form of a sheet of different dimensions which can be wound in rolls. The anode foil can function as a support for the separator wherein the anode foil has an insulator layer formed on the surface thereof with a conductive polymer coating on the insulator and with a conductive separator layer formed on the polymer coating. The use of the anode as a support may minimize operating difficulty. The separator comprises a porous conductive layer which allows direct electrical contact between the anode conductive polymer layer and a cathode. Preferably, the separator has a volume of pores for liquid electrolyte to transit through. Paper or other non-conductive materials, such as polymers, can be used as support for the conductive polymer. Paper is an exemplary separator due to the widespread use and availability. Unlike prior art capacitors the paper does not need to be charred for use as a conductive separator. In the manufacture of prior art capacitors the paper is often charred after formation of the working element to minimize the amount of polymer absorbed into the paper. With the present invention this is unnecessary since the separator can be either coated with conductive polymer or impregnated with conductive polymer to form the conductive separator. The separator may be a fibrous material, such as paper fiber, either physically intermingled or cross-linked to form a continual fibrous, such as paper fiber, layer. The space between the fibers might be partly or fully filled with the conductive polymer. Paper based separators can be manufactured by modification of a finished paper layer or by modification of paper with high conductivity component fibers before forming of paper layer, a dispersion of conductive fibers, pieces, particles or their agglomerates in a liquid or solid state or a deposition of conductive fibers, pieces, particles. The conductive fibers, pieces or particles may comprise a conductive material such as conductive polymer, carbon black, graphite, metal etc., or can be a composite material consisting of a non-conductive core such as paper, plastic etc., modified with a conductive material such as conductive polymer, carbon black, graphite, metal etc.

The conductive separator and non-conductive separator may comprise the same material with the conductive separator having a conductive coating thereon or being impregnated with a conductor neither of which is necessary in the non-conductive separator.

A particularly preferred separator has a width which is suitable for the working element length or production process with a width of 1.5 cm to 500 cm being exemplary for demonstration of the invention. The length is chosen based on the desired capacitance as capacitance is a function of anode and cathode overlap and is therefore directly related to length and width of the cathode and anode. A separator with a length of for 0.1 m to 400 m and thickness of 10 μm up to 300 μm is exemplary for demonstration of the invention.

The conductive polymer is preferably selected from polyaniline, polypyrrole and polythiophene or substitutional derivatives thereof.

A particularly preferred conducting polymer is represented by Formula I:

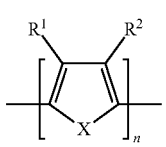

FORMULA 1 wherein $R^1$ and $R^2$ are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups be small to avoid steric interferences. For these reasons $R^1$ and $R^2$ taken together as —O—(CH$_2$)$_2$—O— is most preferred. In Formula 1, X is S, N or O and most preferable X is S. A particularly preferred conductive polymer is polymerized 3,4-polyethylene dioxythiophene (PEDOT).

$R^1$ and $R^2$ independently represent linear or branched C1-C16 alkyl or C2-C18 alkoxyalkyl; or are C3-C8 cycloalkyl, phenyl or benzyl which are unsubstituted or substituted by C1-C6 alkyl, C1-C6 alkoxy, halogen or OR$^3$; or $R^1$ and $R^2$, taken together, are linear C1-C6 alkylene which is unsubstituted or substituted by C1-C6 alkyl, C1-C6 alkoxy, halogen, C3-C8 cycloalkyl, phenyl, benzyl, C1-C4 alkylphenyl, C1-C4 alkoxyphenyl, halophenyl, C1-C4 alkylbenzyl, C1-C4 alkoxybenzyl or halobenzyl, 5-, 6-, or 7-membered heterocyclic structure containing two oxygen elements. $R^3$ preferably represents hydrogen, linear or branched C1-C16 alkyl or C2-C18 alkoxyalkyl; or are C3-C8 cycloalkyl, phenyl or benzyl which are unsubstituted or substituted by C1-C6 alkyl. In a particularly preferred embodiment $R^3$ comprised an anionic group with a corresponding cationic group wherein Formula I is an intrinsically conductive polymer without the necessity of a counterion which is referred to as a self-doping polymer.

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto.

Binders and cross-linkers can be also incorporated into the conductive polymer layer if desired. Suitable materials include poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers.

Other adjuvants, coatings, and related elements can be incorporated into a capacitor, as known in the art, without diverting from the present invention. Mentioned, as a non-limiting summary include, protective layers, multiple capacitive levels, terminals, leads, etc.

EXAMPLES

Example 1

Figure 6:
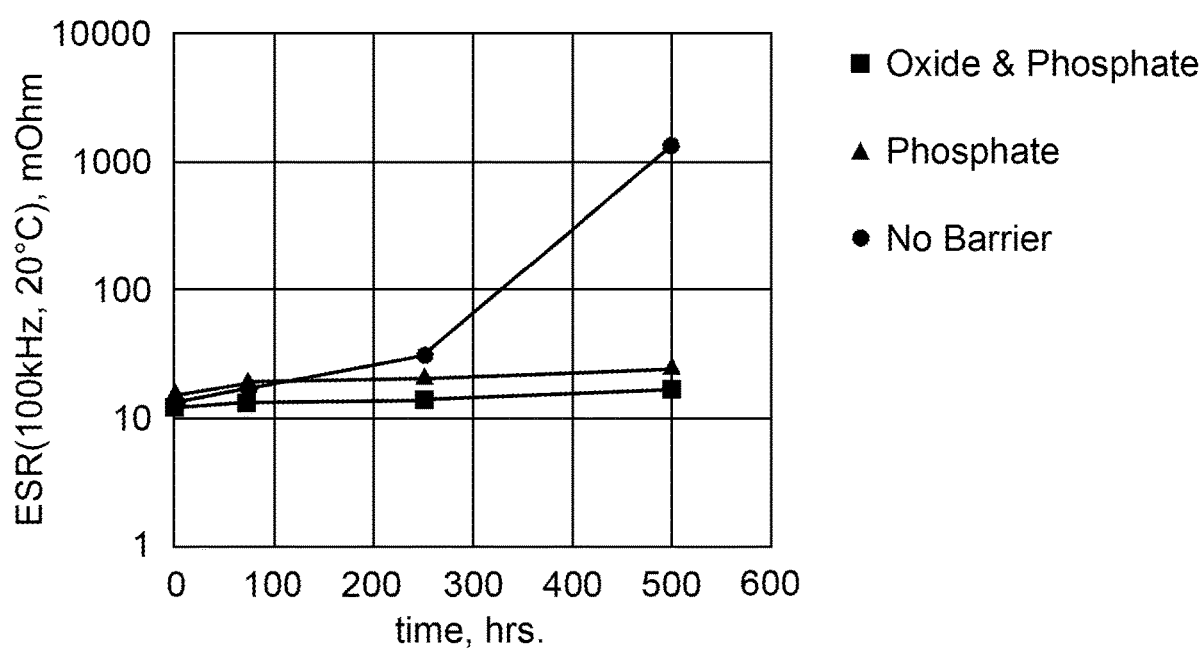
FIG. 6 is a graphical representation of an embodiment of the invention.

Hybrid capacitor samples were prepared based on a carbon coated cathode. Life test showed a significant increase in ESR over time for the samples. The experiment was conducted using 100 uF, 63V capacitors with a 10 mm diameter and a length of 12.2 mm. The endurance test was carried out at 150° C. and 63 V. Three groups of capacitors were tested with the data reported being based on an average of 5 values. The ESR at 100 kHz was reported in mOhm as a function of time. The results are shown in FIG. 6. In FIG. 6, the control (No barrier) had no barrier on the cathode. An inventive sample had a barrier layer formed form phosphate salt (Phosphate) on the cathode. Another inventive sample had the same phosphate layer and addition oxide formed at 3 Vf forming voltage to achieve an additional 3-5 nm of aluminium oxide on the bare areas of the aluminum cathode. All the capacitors were similarly impregnated with 4-Nitrobenzoic acid in the electrolyte. As illustrated in FIG. 6 the inventive samples demonstrate superior performance with regards to ESR stability.

Example 2

Figure 7:
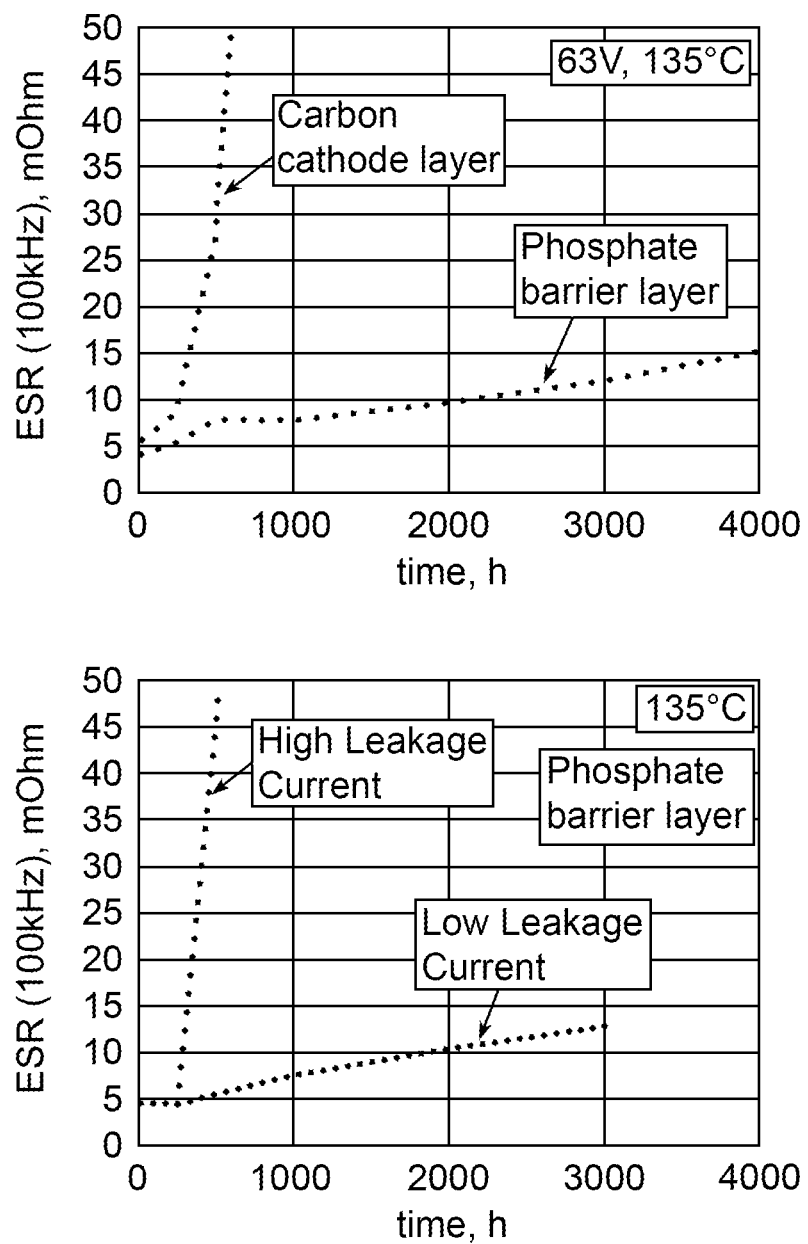
FIG. 7 is a graphical representation of an embodiment of the invention.

A series of hybrid aluminum capacitors were prepared for ESR testing. The average ESR curves, as a function of time, are illustrated graphically in FIG. 7. In the top graph of FIG. 7 a carbon coated cathode is compared with a cathode comprising an aluminium phosphate barrier layer. In the lower graph, low leakage current is compared with high leakage current for a cathode comprising aluminium phosphate as a barrier layer. The carbon coated cathode curves showed slightly higher degradation at 135° C. where ESR is rising very fast. However, leakage current remains the same for both cathodes which indicates that the degradation is voltage independent and occurs even at 0 V. Therefore, the advantages of the instant invention are not voltage dependent and the invention provides significant stability even at high voltage. The conductive polymer used in all examples was 3,4-polyethylene dioxythiophene with polystyrene sulfonate dopant (PEDOT/PSS) which is commercially available.

Physical analysis of the capacitors with increased ESR showed that the separator of the capacitors became violet in color which is consistent with a reduced form of PEDOT/PSS. One can conclude that the observed ESR rise was correlated with polymer reduction. Another important observation is that at 150° C. the samples with carbon coated cathode, and no barrier layer, had a significant amount of formed gas. Considering that measured leakage current was relatively low the gas must have been formed through a mechanism where the leakage current is not involved such as chemical or micro-cell electrochemical mechanisms. The aluminium phosphate protected cathode was less active under cathodic polarization even after modification with the polymer (PEDOT/PSS). SEM and EDS spectra indicated that the barrier layer mainly consist of aluminium phosphate and the concentration of phosphorus is significantly higher in the etched layer. The cathode was protected by the salt and direct electron transfer was suppressed on the surface as well as electrochemical and(or) micro-element electrochemical activity.

Example 3

Figure 8:
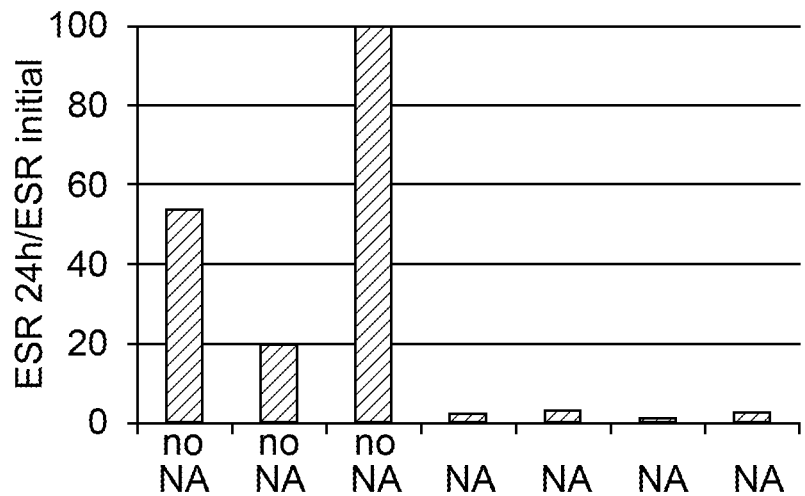
FIG. 8 is a graphical representation of an embodiment of the invention.
Figure 9:
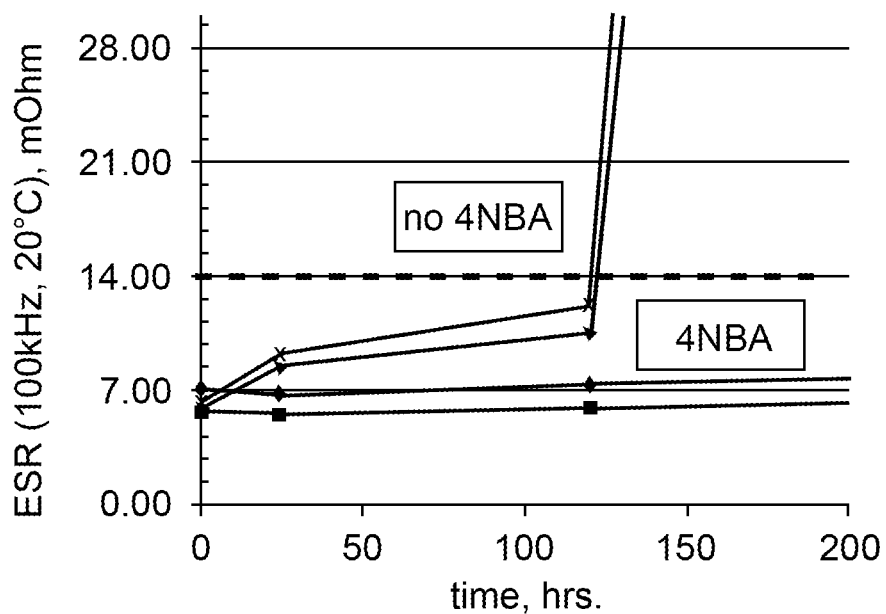
FIG. 9 is a graphical representation of an embodiment of the invention.

63V 400 uF hybrid capacitors were prepared comprising an aluminium anode with preformed dielectric layer, an aluminium cathode with a barrier layer formed form phosphate salt, PEDOT/PSS as the conductive polymer and an electrolyte comprising gamma butyrolactone (GBL), sulfolane, quaternary alkylammonium phthalate and polyethylene glycol with and without nitro compounds as a stabilizer. The stabilization effect of 4-nitroanisole (NA) is illustrated graphically in FIG. 8 wherein the ratio between ESR after 24 h at 125° C./63V and initial ESR is recorded for multiple samples. The comparative samples (No NA) do not have 4-nitroanisole. In the inventive samples (NA), a relatively small ESR increase is observed after 24 h endurance test and a significant ESR increase was observed for the samples without the stabilizer (no NA). The stabilization effect of 4-nitrobenzoic acid (4NBA) is demonstrated in FIG. 9 wherein the initial part of life tests curves at 125° C./63V for hybrid capacitor samples with and without 4-Nitrobenzoic acid and low leakage current are illustrated graphically. Stable ESR curve was observed for the inventive samples and a significant ESR increase was observed after 120 h for the control samples without the stabilizer (no 4NBA).

The invention has been described with reference to preferred embodiments without limit thereto. One of skill in the art would realize additional embodiments which are described and set forth in the claims appended hereto.

The invention claimed is:

1. A capacitor comprising:
an anode with a dielectric on said anode;
a cathode with a barrier layer on said cathode;
a separator between said anode and said cathode;
a conductive polymer between said anode and said cathode;
a liquid electrolyte between said anode and said cathode; and
a stabilizer between said anode and said cathode wherein said stabilizer is an organic peroxide comprising alkyl groups having 1-20 carbons or aromatic groups.

2. The capacitor of claim 1 wherein said anode comprises at least one element selected from the group consisting of tantalum, aluminum, niobium, titanium, zirconium, hafnium, alloys of these elements and a conductive oxide thereof.

3. The capacitor of claim 1 wherein said barrier layer is selected from the group consisting of alumina, silica, silicates, siloxanes, aluminium silicates, phosphates, organic insulating polymers, polyacrylates, polysaccharides, and ceramics.

4. The capacitor of claim 3 wherein said barrier layer is selected from the group consisting of $\{(Ba_{1-x}Ca_x)O\}_m\{(Ti_{1-y}Zr_y)O_2\}_{1-m}$ wherein m is 0-1, $BaTiO_3$, $Ba(Zr_xTi_{1-x})O_3$ or $Ba(Hf_xTi_{1-x})O_3$ wherein x is 0-1 and m is 0-1, polyalkenes, cellulose, chitosan, starch, $H(OSiH_2)_nOH$, $(OSiH_2)_n$ and aluminium phosphate.

5. The capacitor of claim 1 wherein said barrier layer has a thickness of at least 1 nm to no more than 500 nm.

6. The capacitor of claim 1 wherein said barrier layer has a dielectric constant of at least 2.0.

7. The capacitor of claim 6 wherein said barrier layer has a dielectric constant of at least 5.0.

8. The capacitor of claim 7 wherein said barrier layer has a dielectric constant of at least 9.0.

9. The capacitor of claim 1 wherein said barrier layer is an oxide.

10. The capacitor of claim 9 wherein said oxide has a thickness of at least 3 nm to no more than 250 nm.

11. The capacitor of claim 9 wherein said oxide covers at least 90% of a surface area of said cathode.

12. The capacitor of claim 1 wherein said stabilizer has a first electrochemical reduction potential and said conductive polymer has a second electrochemical reduction potential and said first electrochemical reduction potential is higher than said second electrochemical reduction potential.

13. The capacitor of claim 1 wherein said conductive polymer is selected from the group consisting of polyaniline, polyacetylene, polypyrole, polythiophene, polyparaphenylene and polyparaphenylene vinylene.

14. The capacitor of claim 13 wherein said conductive polymer is 3,4-polyethylene dioxythiophene.

15. The capacitor of claim 1 wherein said stabilizer is a soluble stabilizer in said liquid electrolyte.

16. The capacitor of claim 1 wherein said stabilizer is a solid stabilizer or a liquid stabilizer.

17. The capacitor of claim 1 wherein said alkyl groups are selected from the group consisting of straight alkyl groups and branched alkyl groups.

18. The capacitor of claim 1 wherein said stabilizer is selected from the group consisting of:

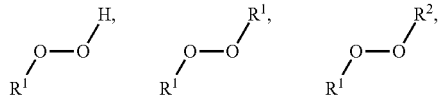

-continued

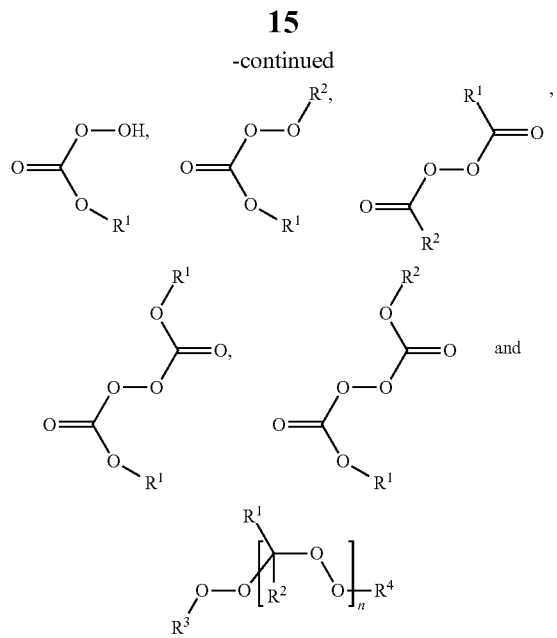

wherein each $R^1$, each $R^2$, $R^3$ and $R^4$ is independently an alkyl group having 1-20 carbons or an aryl group and n is 1 to 20.

19. A capacitor comprising:

an anode with a dielectric on said anode;

a cathode with a barrier layer on said cathode;

a separator between said anode and said cathode;

a conductive polymer between said anode and said cathode;

a liquid electrolyte between said anode and said cathode; and a stabilizer between said anode and said cathode wherein said stabilizer is a chelate complex of transition metals on a polymeric backbone comprising a metal cation, a number of blocks and ligands adjusted to achieve a reduction/oxidation potential which is higher than the electrochemical potential of the polymer.

20. The capacitor of claim 19 wherein said stabilizer is selected from the group consisting of:

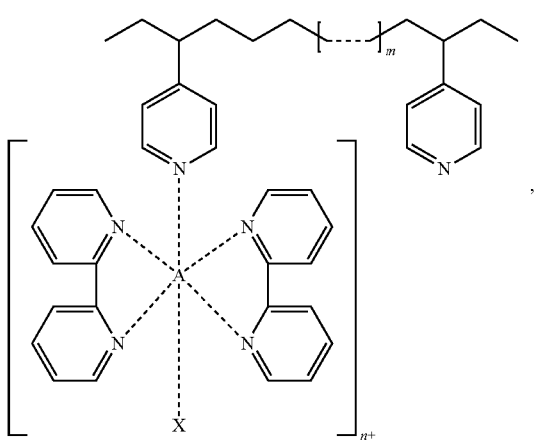

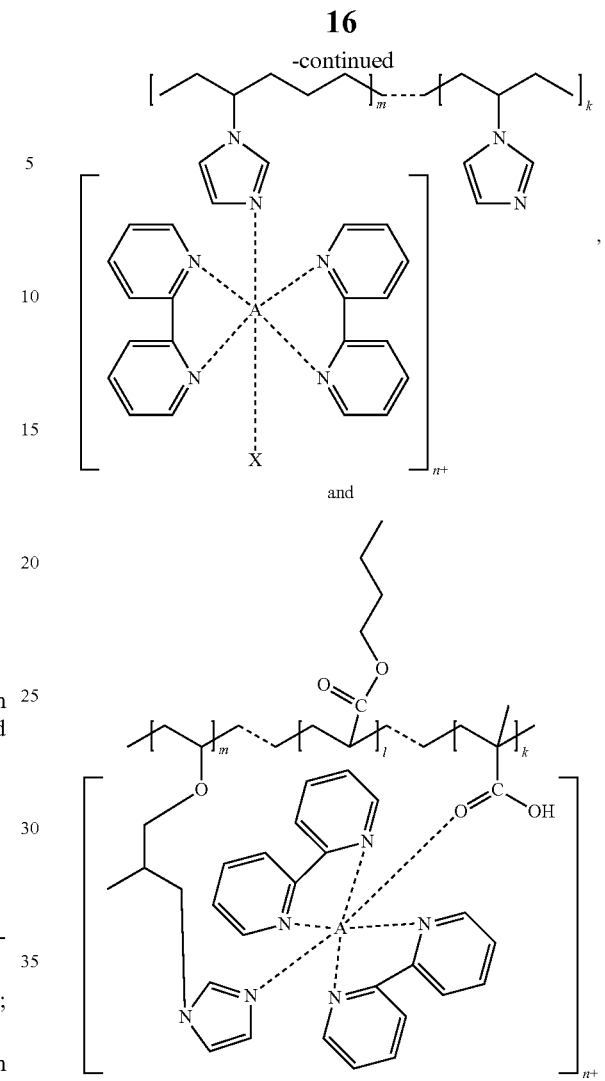

wherein:

A is selected from the group consisting of Fe, Co, Os and Ru;

X is a monomolecular ligand;

n is 1 or 2;

m is 1 to 100;

k is 1 to 100; and l is 1 to 100.

21. The capacitor of claim 20 wherein said X is selected from the group consisting of heptafluorobutyrate, 4-nitrobenzoate, triflate, chloride, bromide, iodide, phosphate, phthalate, tosylate, hexafluorophosphate, tetrafluoroborate and perchlorate.

22. A capacitor comprising:

an anode with a dielectric on said anode;

a cathode with a barrier layer on said cathode;

a separator between said anode and said cathode;

a conductive polymer between said anode and said cathode;

a liquid electrolyte between said anode and said cathode; and a stabilizer between said anode and said cathode wherein said stabilizer is organic nitro compounds wherein said organic nitro compounds are $R^5$—$R^6$—$NO_2$, wherein:

$R^5$ is selected from alkyl of up to 20 carbons, alcohol, carboxyl and hydroxyl group;

$R^6$ is an aromatic $C_6$ ring or a substituted aromatic $C_6$ ring.

23. The capacitor of claim 22 wherein said $R^6$ is substituted by an alkyl of up to 20 carbons or hydroxyl groups.

24. The capacitor of claim 23 wherein said $R^6$ is substituted in the 2 or 3 position on the aromatic C6 ring.

25. The capacitor of claim 24 wherein said $R^6$ is an aromatic naphthalene.

26. The capacitor of claim 25 wherein said $R^6$ is selected from the group consisting of (o,m,p)-nitro anisole, (o,m,p)-nitrobenzyl alcohol, (o,m,p)-nitrobenzoic acid, 4-nitrosalicylic acid and 4-nitro-1-naphthoic acid.

27. A method for forming a hybrid capacitor comprising:
forming an anode with a dielectric on said anode;
forming a cathode with a barrier layer on said cathode;
forming a separator;
forming a working element comprising a layered structure with a conductive polymer, a liquid electrolyte, a stabilizer and said separator between said anode and said cathode wherein said stabilizer is an organic peroxide comprising alkyl groups having 1-20 carbons or aromatic groups.

28. The method for forming a hybrid capacitor of claim 27 wherein said forming of said working element comprises forming a layered structure comprising said anode and said cathode with said separator between said anode and said cathode.

29. The method for forming a hybrid capacitor of claim 28 comprising forming said conductive polymer on at least one of said dielectric, said cathode or said separator prior to said forming of said layered structure.

30. The method for forming a hybrid capacitor of claim 28 comprising forming said conductive polymer after said forming of said layered structure.

31. The method for forming a hybrid capacitor of claim 27 comprising forming said conductive polymer by in situ polymerization.

32. The method for forming a hybrid capacitor of claim 27 comprising applying said conductive polymer as a slurry.

33. The method for forming a hybrid capacitor of claim 27 wherein said anode comprises at least one element selected from the group consisting of tantalum, aluminum, niobium, titanium, zirconium, hafnium, alloys of these elements and a conductive oxide thereof.

34. The method for forming a hybrid capacitor of claim 27 wherein said barrier layer is selected from the group consisting of alumina, silica, silicates, siloxanes, aluminium silicates, phosphates, organic insulating polymers, polyacrylates, polysaccharides, and ceramics.

35. The method for forming a hybrid capacitor of claim 34 wherein said barrier layer is selected from the group consisting of $\{(Ba_{1-x}Ca_x)O\}_m\{(Ti_{1-y}Zr_y)O_2\}_{1-m}$ wherein m is 0-1, $BaTiO_3$, $Ba(Zr_xTi_{1-x})O_3$ or $Ba(Hf_xTi_{1-x})O_3$ wherein x is 0-1 and m is 0-1, polyalkenes, cellulose, chitosan, starch, $H(OSiH_2)_nOH$, $(OSiH_2)_n$ and aluminium phosphate.

36. The method for forming a hybrid capacitor of claim 27 wherein said barrier layer has a thickness of at least 1 nm to no more than 500 nm.

37. The method for forming a hybrid capacitor of claim 27 wherein said barrier layer has a dielectric constant of at least 2.0.

38. The method for forming a hybrid capacitor of claim 37 wherein said barrier layer has a dielectric constant of at least 5.0.

39. The method for forming a hybrid capacitor of claim 38 wherein said barrier layer has a dielectric constant of at least 9.0.

40. The method for forming a hybrid capacitor of claim 27 wherein said barrier layer is an oxide.

41. The method for forming a hybrid capacitor of claim 40 wherein said oxide has a thickness of at least 3 nm to no more than 250 nm.

42. The method for forming a hybrid capacitor of claim 40 wherein said oxide covers at least 90% of a surface area of said cathode.

43. The method for forming a hybrid capacitor of claim 27 wherein said stabilizer has a first electrochemical reduction potential and said conductive polymer has a second electrochemical reduction potential and said first electrochemical reduction potential is higher than said second electrochemical reduction potential.

44. The method for forming a hybrid capacitor of claim 27 wherein said conductive polymer is selected from the group consisting of polyaniline, polyacetylene, polypyrole, polythiophene, polyparaphenylene and polyparaphenylene vinylene.

45. The method for forming a hybrid capacitor of claim 44 wherein said conductive polymer is 3,4-polyethylene dioxythiophene.

46. The method for forming a hybrid capacitor of claim 27 wherein said stabilizer is a soluble stabilizer in said liquid electrolyte.

47. The method for forming a hybrid capacitor of claim 27 wherein said stabilizer is a solid stabilizer or a liquid stabilizer.

48. The method for forming a hybrid capacitor of claim 27 wherein said alkyl groups are selected from the group consisting of straight alkyl groups and branched alkyl groups.

49. The method for forming a hybrid capacitor of claim 27 wherein said stabilizer is selected from the group consisting of:

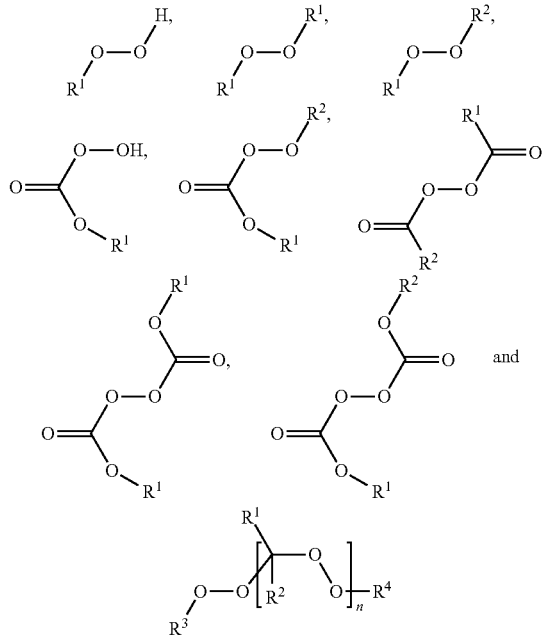

wherein each $R^1$, each $R^2$, $R^3$ and $R^4$ is independently an alkyl group having 1-20 carbons or an aryl group and n is 1 to 20.

50. A method for forming a hybrid capacitor comprising:
forming an anode with a dielectric on said anode;
forming a cathode with a barrier layer on said cathode;
forming a separator;
forming a working element comprising a layered structure with a conductive polymer, a liquid electrolyte, a stabilizer and said separator between said anode and said cathode wherein said stabilizer comprises chelate complexes of transition metals on a polymeric backbone comprising a metal cation, a number of blocks and ligands adjusted to achieve a reduction/oxidation potential which is higher than the electrochemical potential of the polymer.

51. The method for forming a hybrid capacitor of claim 50 wherein said stabilizer is selected from the group consisting of:

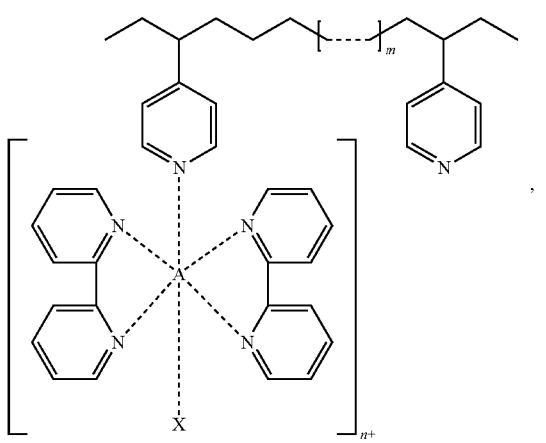

,

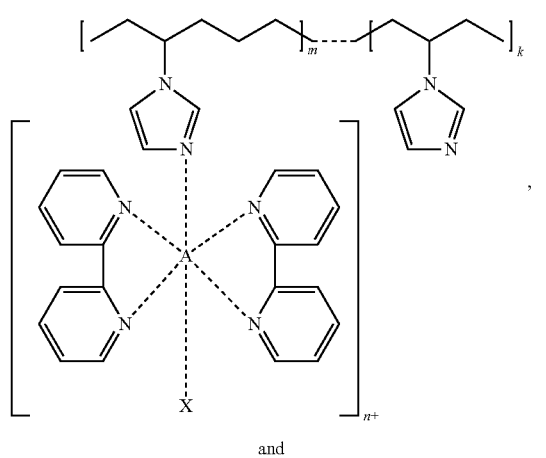

and

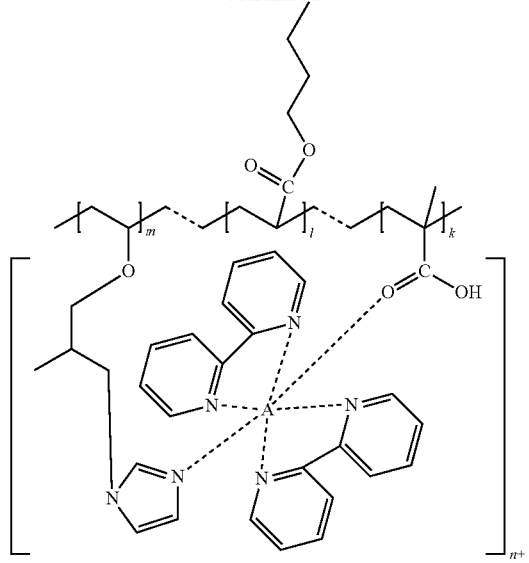

wherein:
A is selected from the group consisting of Fe, Co, Os and Ru;
X is a monomolecular ligand;
n is 1 or 2;
m is 1 to 100;
k is 1 to 100; and
l is 1 to 100.

52. The method for forming a hybrid capacitor of claim 51 wherein said X is selected from the group consisting of heptafluorobutyrate, 4-nitrobenzoate, triflate, chloride, bromide, iodide, phosphate, phthalate, tosylate, hexafluorophosphate, tetrafluoroborate and perchlorate.

53. A method for forming a hybrid capacitor comprising:
forming an anode with a dielectric on said anode;
forming a cathode with a barrier layer on said cathode;
forming a separator;
forming a working element comprising a layered structure with a conductive polymer, a liquid electrolyte, a stabilizer and said separator between said anode and said cathode wherein said stabilizer comprises organic nitro compounds wherein said organic nitro compounds are $R^5$—$R^6$—$NO_2$, wherein:
$R^5$ is selected from alkyl of up to 20 carbons, alcohol, carboxyl and hydroxyl group;
$R^6$ is an aromatic $C_6$ ring or a substituted aromatic $C_6$ ring.

54. The method for forming a hybrid capacitor of claim 53 wherein said $R^6$ is substituted by an alkyl of up to 20 carbons or hydroxyl groups.

55. The method for forming a hybrid capacitor of claim 54 wherein said $R^6$ is substituted in the 2 or 3 position on the aromatic $C_6$ ring.

56. The method for forming a hybrid capacitor of claim 55 wherein said $R^6$ is an aromatic naphthalene.

57. The method for forming a hybrid capacitor of claim 56 wherein said $R^6$ is selected from the group consisting of (o,m,p)-nitro anisole, (o,m,p)-nitrobenzyl alcohol, (o,m,p)-nitrobenzoic acid, 4-nitrosalicylic acid and 4-nitro-1-naphthoic acid.

58. A capacitor comprising:
an anode with a dielectric on said anode;
a cathode with a barrier layer on said cathode;
a separator between said anode and said cathode;

a conductive polymer between said anode and said cathode;

a liquid electrolyte between said anode and said cathode; and a stabilizer between said anode and said cathode wherein said stabilizer is a gas stabilizer.

59. The capacitor of claim 58 wherein said gas stabilizer is oxygen.

60. The capacitor of claim 59 wherein said oxygen in a concentration of 1 ppm to 1000 ppm of total gas volume in said capacitor.

61. A method for forming a hybrid capacitor comprising:
forming an anode with a dielectric on said anode;
forming a cathode with a barrier layer on said cathode;
forming a separator;
forming a working element comprising a layered structure with a conductive polymer, a liquid electrolyte, a stabilizer and said separator between said anode and said cathode wherein said stabilizer is a gas stabilizer.

62. The method for forming a hybrid capacitor of claim 61 wherein said gas stabilizer is oxygen.

63. The method for forming a hybrid capacitor of claim 62 wherein said oxygen in a concentration of 1 ppm to 1000 ppm of total gas volume in said capacitor.

\* \* \* \* \*